(12) United States Patent
Maihöfer

(10) Patent No.: US 10,081,332 B2
(45) Date of Patent: Sep. 25, 2018

(54) SYSTEM AND METHOD FOR SHUTTING DOWN AN UNLAWFULLY UTILIZED VEHICLE

(71) Applicant: DAIMLER AG, Stuttgart (DE)

(72) Inventor: Christian Maihöfer, Iggingen (DE)

(73) Assignee: DAIMLER AG, Stuttgart (DE)

(*) Notice: Subject to any disclaimer, the term of this patent is extended or adjusted under 35 U.S.C. 154(b) by 5 days.

(21) Appl. No.: 15/039,200

(22) PCT Filed: Nov. 13, 2014

(86) PCT No.: PCT/EP2014/003044
§ 371 (c)(1),
(2) Date: May 25, 2016

(87) PCT Pub. No.: WO2015/082039
PCT Pub. Date: Jun. 11, 2015

(65) Prior Publication Data
US 2017/0050614 A1 Feb. 23, 2017

(30) Foreign Application Priority Data

Dec. 4, 2013 (DE) .......................... 10 2013 020 333

(51) Int. Cl.
*B60R 25/01* (2013.01)
*B60R 25/045* (2013.01)
(Continued)

(52) U.S. Cl.
CPC .............. *B60R 25/01* (2013.01); *B60R 25/04* (2013.01); *B60R 25/045* (2013.01);
(Continued)

(58) Field of Classification Search
CPC .............................. B60K 28/04; H04M 11/00
See application file for complete search history.

(56) References Cited

U.S. PATENT DOCUMENTS 5,513,244 A * 4/1996 Joao ...................... B60R 25/018
340/425.5
5,969,433 A * 10/1999 Maggiora ............... B60R 25/04
180/287

(Continued)

FOREIGN PATENT DOCUMENTS

| CN | 101670830 A | 3/2010 |
| CN | 102910145 A | 2/2013 |

(Continued)

OTHER PUBLICATIONS

International Search Report dated Feb. 2, 2015 in related International Application No. PCT/EP2014/003044.

(Continued)

*Primary Examiner* — Alex C Dunn
(74) *Attorney, Agent, or Firm* — Patent Portfolio Builders PLLC

(57) ABSTRACT

A system and a method for shutting down an illegally used vehicle involves a first control device of the vehicle receiving a vehicle shutdown command and a server connected to the first control device and which transmits the vehicle shutdown command to the first control device. The first control device requests confirmation of the vehicle shutdown command in an external authorization system before the shutdown of the vehicle and a second control device initiates the shutdown of the vehicle.

14 Claims, 5 Drawing Sheets

Figure 1:
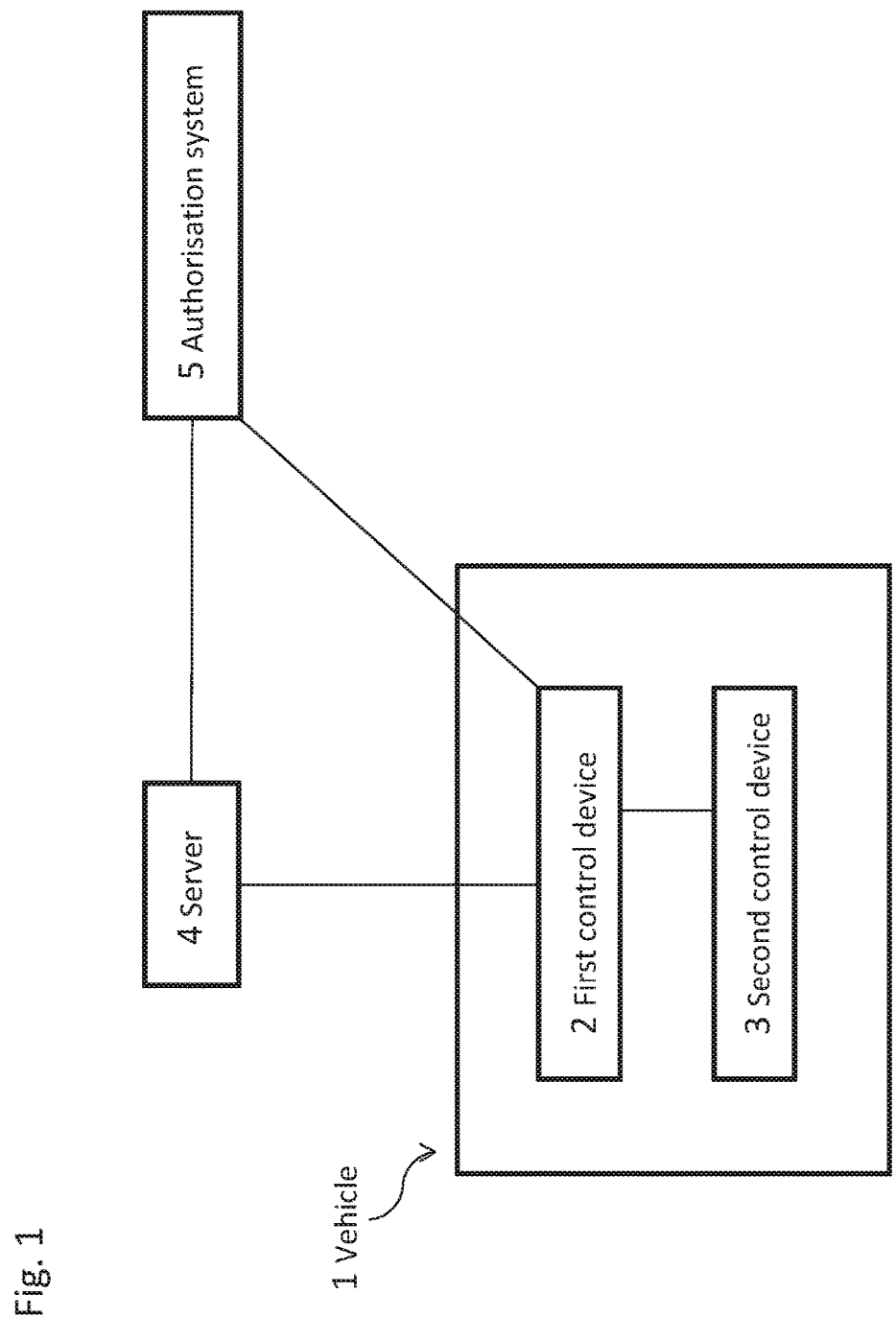

(51) Int. Cl.
*B60R 25/04* (2013.01)
*B60R 25/102* (2013.01)
*B60R 25/10* (2013.01)

(52) U.S. Cl.
CPC .... *B60R 25/102* (2013.01); *B60R 2025/0405* (2013.01); *B60R 2025/1016* (2013.01)

(56) References Cited

U.S. PATENT DOCUMENTS

| | | | |
|---|---|---|---|
| 6,400,042 B1* | 6/2002 | Winner, Jr. | B60R 25/045 180/287 |
| 6,587,046 B2* | 7/2003 | Joao | B60R 25/102 340/539.14 |
| 6,615,186 B1 | 9/2003 | Kolls | |
| 6,647,328 B2* | 11/2003 | Walker | B60R 25/02 701/2 |
| 6,717,527 B2 | 4/2004 | Simon | |
| 7,091,821 B2* | 8/2006 | Lessard | B60R 25/04 340/426.11 |
| 7,277,010 B2* | 10/2007 | Joao | B60R 25/102 340/539.14 |
| 7,305,294 B2* | 12/2007 | Bate | B60R 25/04 303/122.04 |
| 2001/0056544 A1* | 12/2001 | Walker | B60R 25/02 726/2 |
| 2003/0016130 A1* | 1/2003 | Joao | B60R 25/102 340/539.1 |
| 2003/0231208 A1* | 12/2003 | Hanon | G06F 3/048 715/764 |
| 2004/0046639 A1* | 3/2004 | Giehler | B60R 25/24 340/5.63 |
| 2004/0160319 A1* | 8/2004 | Joao | B60R 25/018 340/539.1 |
| 2004/0176978 A1 | 9/2004 | Simon et al. | |
| 2004/0177034 A1 | 9/2004 | Simon et al. | |
| 2005/0033483 A1 | 2/2005 | Simon et al. | |
| 2005/0134438 A1 | 6/2005 | Simon | |
| 2005/0162016 A1 | 7/2005 | Simon | |
| 2006/0108417 A1 | 5/2006 | Simon et al. | |
| 2006/0111822 A1 | 5/2006 | Simon | |
| 2006/0136314 A1 | 6/2006 | Simon | |
| 2007/0136083 A1 | 6/2007 | Simon et al. | |
| 2007/0222293 A1 | 9/2007 | Shimomura | |
| 2007/0299567 A1 | 12/2007 | Simon et al. | |
| 2008/0319817 A1 | 12/2008 | Simon | |
| 2009/0198603 A1 | 8/2009 | Simon et al. | |
| 2009/0234770 A1 | 9/2009 | Simon | |
| 2013/0066525 A1* | 3/2013 | Tomik | B60K 28/04 701/45 |
| 2013/0229052 A1* | 9/2013 | Kitanaka | B60L 3/003 307/9.1 |

FOREIGN PATENT DOCUMENTS

| | | |
|---|---|---|
| JP | 2007253728 A | 10/2007 |
| WO | 01/08944 A1 | 2/2001 |
| WO | 2010/013043 A1 | 2/2010 |

OTHER PUBLICATIONS

Written Opinion dated Feb. 2, 2015 in related International Application No. PCT/EP2014/003044.

Office Action dated Mar. 3, 2017 in related CN Application No. 201480066177.X (References WO 2010/013043 and U.S. Pat. No. 6,615,186 were previously cited in the IDS filed on May 25, 2016).

* cited by examiner

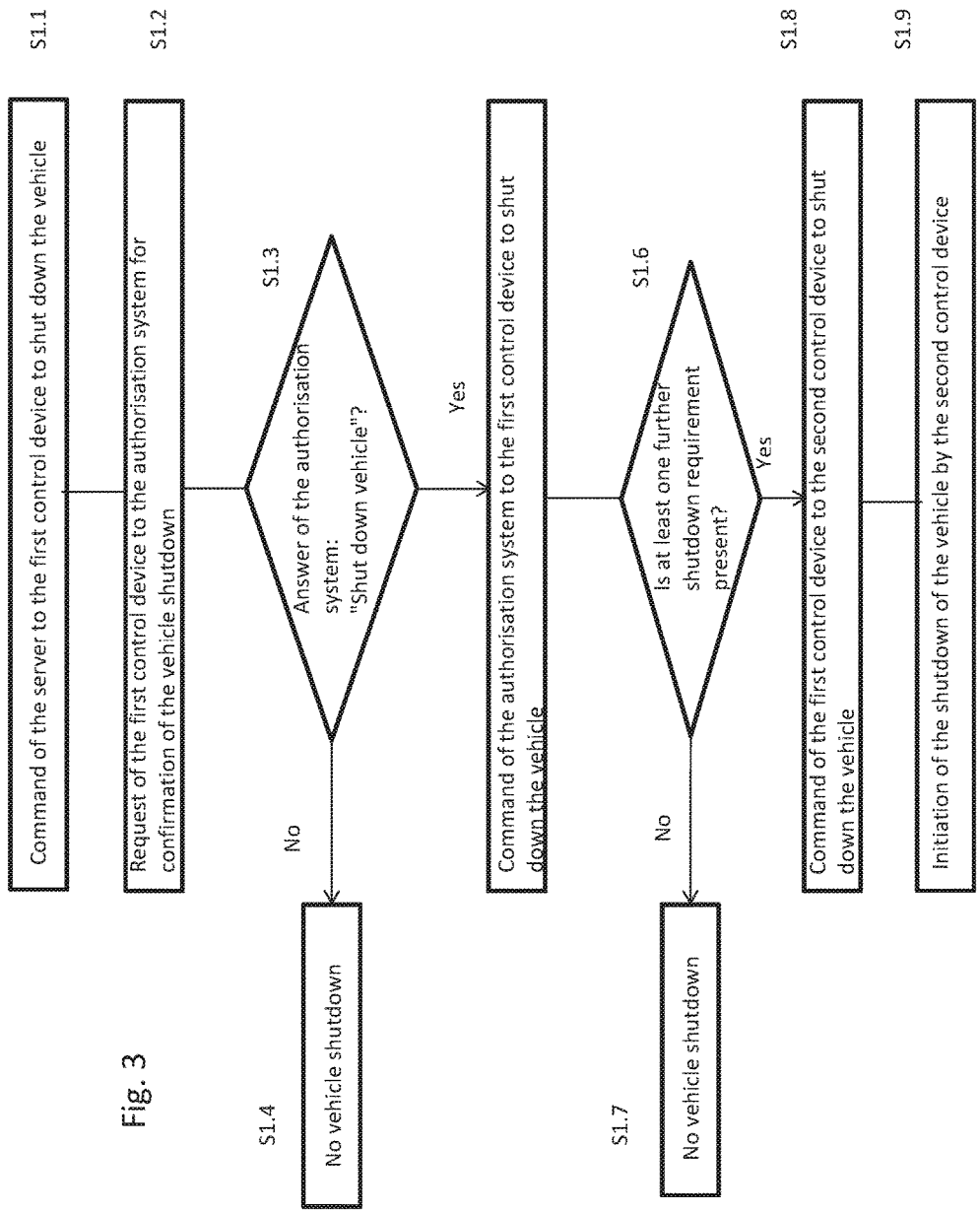

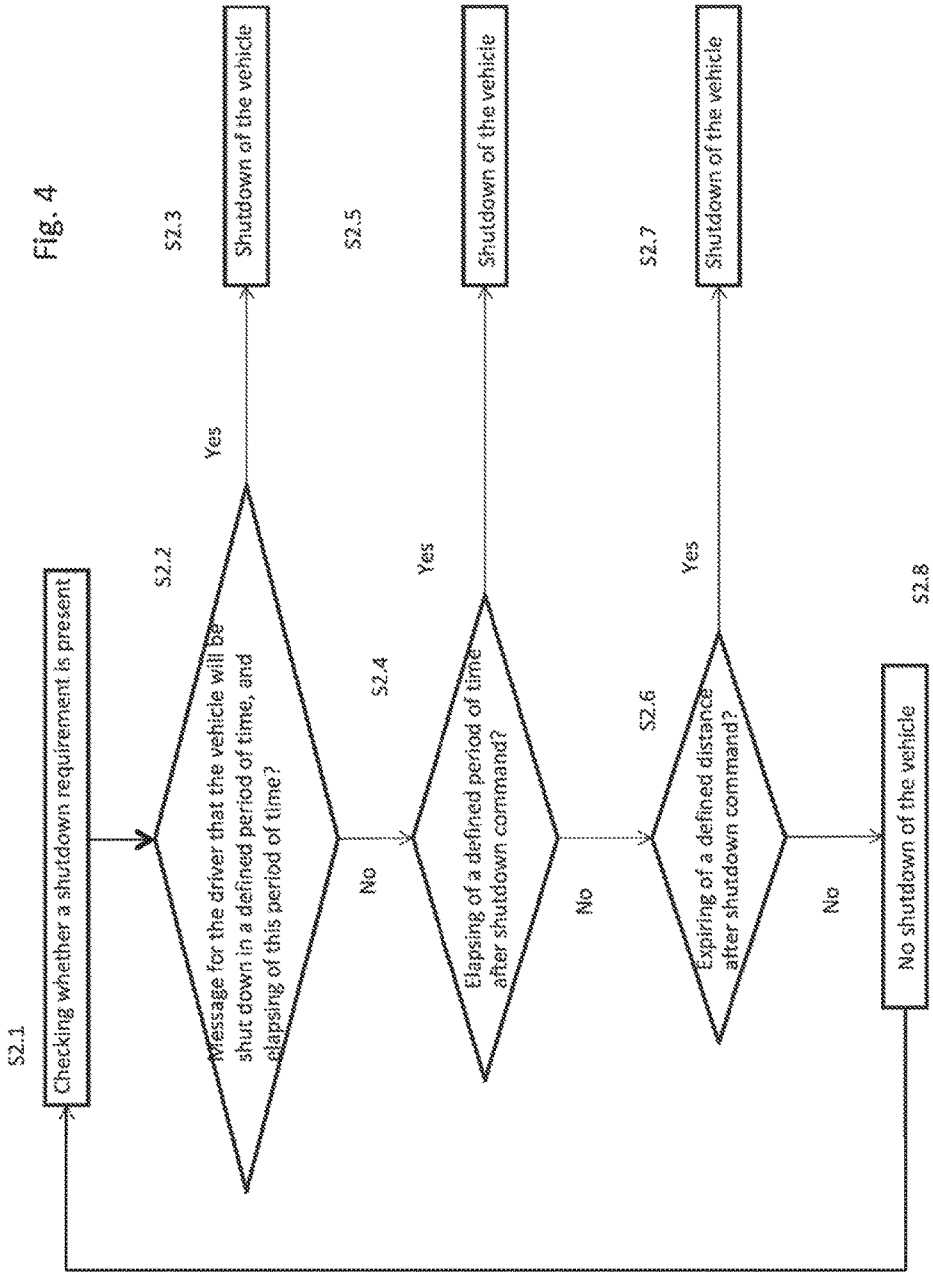

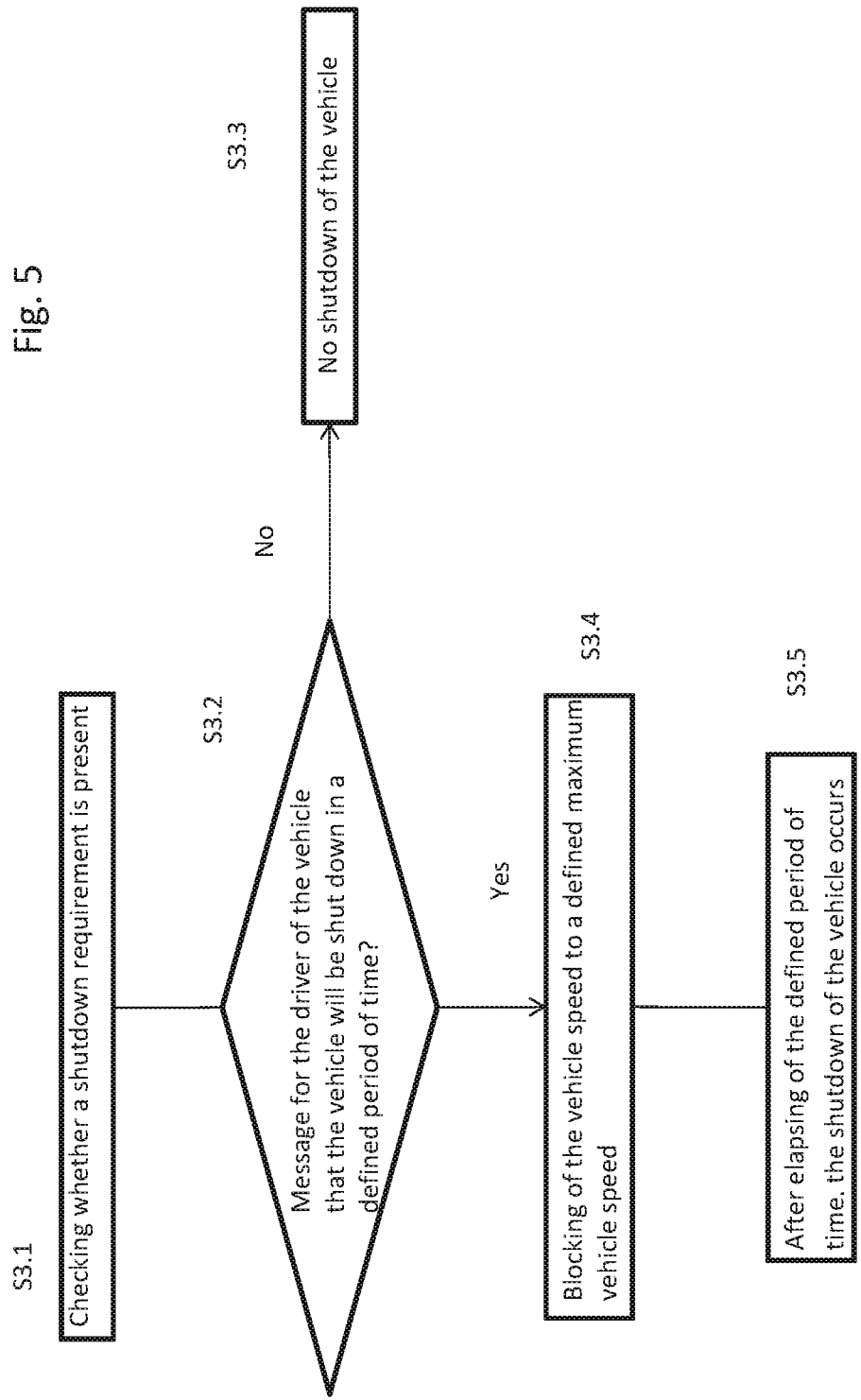

SYSTEM AND METHOD FOR SHUTTING DOWN AN UNLAWFULLY UTILIZED VEHICLE

BACKGROUND AND SUMMARY OF THE INVENTION

Exemplary embodiments of the invention relate to a system and a method for shutting down an illegally used vehicle.

PCT publication WO 0108944 A1 discloses a device to shut down an illegally used vehicle in which a vehicle component necessary for operation is deactivated by a safety control device if a deactivation condition is fulfilled. An output signal of a speed detection is supplied to the safety control device. A deactivation of the vehicle component necessary for operation occurs depending on the output signal of the speed detection. Detection means of a further variable that is characteristic of the switched-off and unused state of the motor vehicle are provided to deactivate the vehicle component necessary for operation depending on the detected variable.

A device is therefore described in prior art that reduces the risk of a shutdown of a vehicle in critical situations. It is not described that the shutdown command must be authorized and a misuse of the shutdown function can thereby be prevented.

Exemplary embodiments of the present invention are directed to a system and method for preventing the misuse of the shutdown of vehicles by unauthorized persons.

The system to shut down an illegally used vehicle comprises a first control device of the vehicle to receive a vehicle shutdown command, and a server, wherein the server is connected to the first control device and the server transmits the vehicle shutdown command to the first control device. Before the shutdown of the vehicle, the first control device requests a confirmation of the vehicle shutdown command in an external authorization system and a second control device initiates the shutdown of the vehicle.

The shutdown of an illegally used vehicle is understood, for example, to be the deactivation of a vehicle component necessary for operation, for example in the case of a stolen vehicle, or in the case of a vehicle for which the leasing fees have not been paid. The shutdown command is, for example, generated by the owner or user of the vehicle or the leasing company. Illegally used means that the vehicle is used without the agreement of, for example, the owner or user of the vehicle.

The first control device is, for example, a COM module. The COM module receives, for example, the shutdown command from the server and commands the second control device to shut down the vehicle. The second control device is, for example, the control device for a vehicle component necessary for operation, for example the control device of the engine. The shutdown can, for example, appear such that the engine can no longer be started. The server is, for example, stationed outside the vehicle. The vehicle shutdown command is, for example, a command or code signal that the vehicle is to be shut down. The vehicle shutdown command must be confirmed in an external authorization system, since otherwise a shutdown could be commanded by anyone. Therefore, a misuse of the shutdown is prevented. The external authorization system is, for example, a mobile telephone on which the authorized owner or user of the vehicle receives a message as to whether the vehicle is to be shut down.

An advantage of the system is that misuse of the shutdown function is prevented, since the shutdown command must be confirmed by the authorized owner or user of the vehicle.

A further advantage is that pre-existing devices of the vehicle can be used to execute the shutdown, which incurs no further costs.

A further advantage is that the shutdown of the vehicle is initiated by the second control device, which further protects against an illegal shutdown of the vehicle.

In an advantageous embodiment the external authorization system transmits the confirmation of the vehicle shutdown command to the server or to the first control device.

The external authorization system is, for example, a mobile telephone on which the authorized owner or user of the vehicle receives a message as to whether the vehicle is to be shut down. The confirmation is, for example, the answer to the message that the authorized owner or user of the vehicle receives. The owner or user can therefore confirm the shutdown of the vehicle using the external authorization system. This confirmation that the vehicle is to be shut down is transmitted to the server or the first control device. The server processes the confirmation and commands, for example, the first control device to shut down the vehicle. If the confirmation of the vehicle shutdown command is transmitted directly to the first control device, then the first control device processes the confirmation and commands, for example, the second control device to shut down the vehicle.

It is advantageous that misuse of the shutdown function is prevented by the confirmation of the shutdown command. Due to the transmission of the confirmation to the server and the processing by the server, safety is improved and can be better controlled by a central system.

It is additionally advantageous that a communicative connection is only necessary for the confirmation of the vehicle shutdown command by transmission of the confirmation to the first control device. It is also advantageous that the first control device can be well monitored and that the system is less susceptible to faults.

In a further advantageous embodiment the first control device transmits the confirmed shutdown command to the second control device.

The confirmed shutdown command is, for example, the encrypted answer to the message that the authorized owner or user of the vehicle receives. The first control device receives, for example, the confirmed command to shut down the vehicle from the external authorization system or from the server. The first control device, which, for example, is the COM module, then further transmits the command to the second control device. The second control device is, for example, the engine control device. This control device then initiates the shutdown of the vehicle. The shutdown can, for example, appear such that the engine can no longer be started. For example, only a defined number of vehicles can be shut down in a defined period of time.

It is advantageous that the second control device is not commanded to shut down the vehicle directly by the server or external authorization system. This prevents misuse of the shutdown function and increases the safety of the passenger of the vehicle and the safety of other people in the surrounding environment of the vehicle.

A further advantageous embodiment is that the vehicle shutdown command and the confirmation of the vehicle shutdown command are encrypted.

Encrypted means that the command or the confirmation of the command to shut down the vehicle is encrypted by a suitable program in order to not be manipulated by potential third parties.

The vehicle has, for example, a key to protect the vehicle shutdown, which can only be overcome using the corresponding counter key; in other words the function for vehicle shutdown requires a counter key. This can, for example, occur using a signature with the counter key. The counter key can, for example, be kept safe in a secure location, for example with one person or a few people authorized for the shutdown.

An advantage is that, by encrypting the commands, misuse and manipulation of the shutdown function are prevented.

The method to shut down an illegally used vehicle comprises the following steps:
- transmitting a vehicle shutdown command from a server to a first control device and
- checking a shutdown requirement before the vehicle shutdown.

The method has the property that a confirmation of the vehicle shutdown command is requested by the first control device in an external authorization system and that, in the presence of the confirmation of the vehicle shutdown command and at least one shutdown requirement, the vehicle shutdown is initiated by a second control device.

A shutdown requirement is a requirement that must be fulfilled in order to shut down the vehicle. Without this requirement, the shutdown of a vehicle cannot be initiated. The shutdown requirement is, for example, the requirement that the vehicle is in a switched-off and unused state. The test of the shutdown requirement occurs, for example, via devices for the detection of the speed of a vehicle.

An advantage of this method is that the vehicle cannot be shut down in critical situations, for example on a level crossing or on a busy road. This suggests a high level of safety for the passenger of the vehicle to be shut down and for potential third parties.

A further advantageous embodiment of the method is that the shutdown requirement is a message for the driver that the vehicle will be shut down after a defined period of time.

The driver receives, for example, a message displayed on the on-board computer or on the screen of the navigation device that the vehicle will be shut down in a defined period of time. This period of time is able to be defined freely. The vehicle can only be shut down if the confirmation of the vehicle shutdown command is present and the previously described period of time after receipt of the message has elapsed.

An advantage of this method is that the vehicle cannot be shut down in critical situations, for example on a level crossing or on a busy road. The driver can therefore still switch off his vehicle at a secure location, since he can continue to move the vehicle for a defined period of time.

A further advantageous embodiment is that the shutdown requirement is an elapsed period of time in which the vehicle can still be moved despite the shutdown command.

The period of time which must expire in order to shut down the vehicle is able to be defined freely. The vehicle can therefore still continue to be moved for a defined period of time after receiving the shutdown command. Only after the period of time has elapsed can the vehicle be shut down. The period of time can, for example, be detected by a clock installed in the vehicle. A further requirement for the shutdown is the presence of the confirmation of the vehicle shutdown command.

An advantage of this method is that the vehicle cannot be shut down in critical situations, for example on a level crossing or on a busy road. The driver can therefore still switch off his vehicle at a secure location, since he can continue to move the vehicle for a defined period of time.

A further advantageous embodiment is that the shutdown requirement is an expired distance until which the vehicle can still continue to be moved despite the shutdown command.

The distance that must expire in order to shut down the vehicle can be defined freely. The vehicle can therefore still continue to be moved after receiving the shutdown command for a defined driving distance. Only after the distance has expired can the vehicle be shut down. This distance can, for example, be detected by the odometer of the vehicle. A further requirement for the shutdown is the presence of the confirmation of the vehicle shutdown command.

An advantage of this method is that the vehicle cannot be shut down in critical situations, for example on a level crossing or on a busy road. The driver can therefore still switch off his vehicle at a secure location, since the driver can still continue to move the vehicle for a defined driving distance.

A further advantageous embodiment of the method is that the shutdown requirement is the standstill of the vehicle.

The standstill of the vehicle is understood, for example, to be a parked vehicle or, for example, a vehicle in which the ignition has been switched off. A vehicle is not considered to be at a standstill if only the tires are at a standstill and the engine is running. Even if the vehicle is stalled, this does not suggest a standstill.

The standstill can, for example, be detected by the speed detection and the engine or oil temperature.

An advantage of the method is that the vehicle is not shut down in a critical situation, for example on a level crossing. This suggests a high level of safety for the passengers of the vehicle.

A further advantageous development of the method is that, in the case of a confirmed vehicle shutdown command, the vehicle speed is blocked at a defined maximum vehicle speed.

The vehicle speed of a vehicle is, for example, 250 km/h. This vehicle speed is blocked in the case of a confirmed vehicle shutdown command to a defined maximum vehicle speed. This maximum speed can be defined freely. It is, for example, 100 km/h.

In this example, the vehicle can therefore still continue to be moved only at a maximum of 100 km/h after receiving the vehicle shutdown command. This is achieved, for example, by the engine power being restricted. The speed can, for example, be detected by the speedometer or the wheel rotational speed.

An advantage of this development is that potential thieves cannot drive the vehicle too quickly and therefore, for example, could not cross the border of the country in a short amount of time.

There are now different possibilities to design and develop the teaching of the present invention in an advantageous manner. For this purpose reference is made to the explanation below of the embodiment.

The present invention is explained below in more detail by means of several exemplary embodiments with reference to the enclosed drawings. It must be noted that the drawings show preferred embodiments of the invention but are not limited to these.

BRIEF DESCRIPTION OF THE DRAWING FIGURES

The drawings, each in schematic depiction:

FIG. 1 basic structure of a system to shut down an illegally used vehicle 1 having a first control device 2, a second control device 3, a server 4, and an authorization system 5 according to one exemplary embodiment of the present invention.

Figure 2:
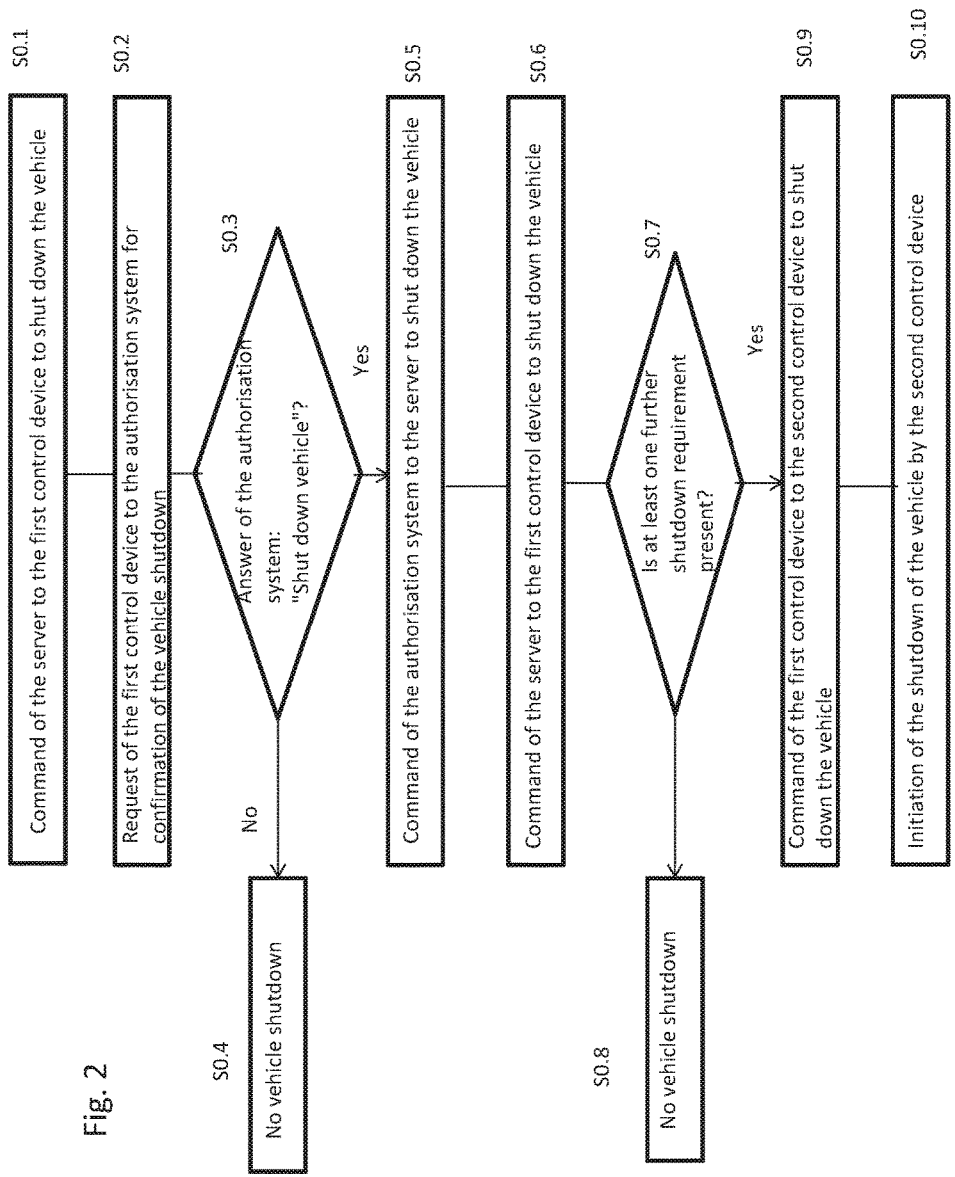

FIG. 2 flow diagram of a method to control the system to shut down a vehicle 1 according to one exemplary embodiment of the present invention.

FIG. 3 further exemplary flow diagram of a method to control the system to shut down a vehicle 1 according to one exemplary embodiment of the present invention.

FIG. 4 flow diagram of a method to check whether a shutdown requirement is present, according to one exemplary embodiment of the present invention.

FIG. 5 flow diagram of a method to control the system to shut down a vehicle 1 with blocking of the vehicle speed according to one exemplary embodiment of the present invention.

DETAILED DESCRIPTION

FIG. 1 shows the fundamental construction of a system to shut down an illegally used vehicle 1. The system comprises a first control device 2, a second control device 3, a server 4 and an authorization system 5. The first control device 2, and the second control device 3 are components of the vehicle 1. The server 4 and the authorization system 5 are not components of the vehicle 1. The server 4 receives, for example, a vehicle shutdown command. The server 4 further transmits this command to the first control device 2. Since this transmission could be manipulated at any time by third parties, the first control device 2 requests the confirmation of the vehicle shutdown in an external authorization system 5. The external authorization system 5 is, for example, a mobile telephone of the vehicle owner or user. The owner receives a message on this mobile telephone, for example an SMS, in which the owner is to confirm or decline the vehicle shutdown. If the owner declines the vehicle shutdown, a signal is transmitted to the server 4 or the first control device 2 that the vehicle is not to be shut down. If the owner or user of the vehicle confirms the vehicle shutdown, then the owner or user transmits the command to the server 4 or the first control device 2 to shut down the vehicle. The server 4 further transmits the shutdown command to the first control device 2. The first control device 2 checks whether a shutdown requirement is present. If a shutdown requirement is present, then the first control device 2 further transmits the command to the second control device 3. The second control device 3 initiates the shutdown of the vehicle 1. The shutdown of the vehicle 1 occurs, for example, via the engine control, by the vehicle 1, for example, no longer being able to be started.

FIG. 2 shows a flow diagram of a method to control the system to shut down a vehicle 1.

In a first step S0.1, the server 4 transmits a command to shut down the vehicle 1 to the first control device 2. This command can, for example, be transmitted to the first control device 2 by means of a mobile network.

In a second step S0.2, the first control device 2 requests confirmation of the vehicle shutdown command in the external authorization system 5. The request can, for example, occur using a mobile radio network.

In a third step S0.3, it is checked whether the answer of the authorization system is "shut down vehicle". If the answer is No, then, in step S0.4, the vehicle is not shut down.

If the answer in step S0.3 is Yes, then, in step S0.5, the command to shut down the vehicle is transmitted from the authorization system 5 to the server 4.

In step S0.6, the server in turn further transmits the command to shut down the vehicle to the first control device 2. The transfer of the data and commands occurs in an encrypted manner, whereby an alteration of the data and commands by third parties is ruled out.

In step S0.7, it is checked whether at least one further shutdown requirement is present. FIG. 4 describes how the checking occurs.

If no shutdown requirement is present, then, in step S0.8, the vehicle 1 is not shutdown.

If a shutdown requirement is present in step S0.7, then method step S0.9 follows. Here, the first control device 2 transmits the command to shut down the vehicle 1 to the second control device 3.

In step S0.10, the second control device 3 now initiates the shutdown of the vehicle 1. The shutdown of the vehicle 1 appears, for example, such that the second control device 3, which, for example, is the engine control, restricts the engine power or prevents a starting of the engine.

FIG. 3 shows a further flow diagram of a method to control the system to shut down a vehicle 1.

In a first step S1.1, the server 4 transmits a command to shut down the vehicle 1 to the first control device 2. This command can, for example, be transmitted to the first control device 2 using a mobile network.

In a second step S1.2, the first control device 2 requests a confirmation of the vehicle shutdown command in the external authorization system 5. The request can, for example, occur using a mobile network.

In a third step S1.3 it is checked whether the answer of the authorization system 5 is "shut down vehicle". If the answer is No, then, in step S1.4, the vehicle 1 is not shut down.

If the answer is Yes in step S1.3, then, in step S1.5, the command to shut down the vehicle is transmitted to the first control device 2 by the authorization system 5. The transfer of the data and commands occurs in an encrypted manner, whereby an alteration of the data and commands by third parties is ruled out.

In step S1.6, it is checked whether at least one further shutdown requirement is present. FIG. 4 describes how the checking occurs.

If no shutdown requirement is present, then in step S1.7, the vehicle 1 is not shut down.

If a shutdown requirement is present in step S1.6, then method step S1.8 follows. Here, the first control device 2 transmits the command to shut down the vehicle 1 to the second control device 3.

In step S1.9, the second control device 3 now initiates the shutdown of the vehicle 1. The shutdown of the vehicle 1 appears, for example, such that the second control device 3, which is, for example, the engine control, restricts the engine functions or prevents a starting of the engine.

FIG. 4 shows a flow diagram of a method for checking whether a shutdown requirement is present. A shutdown requirement is a necessary condition that must be present in order to shut down a vehicle.

In step S2.1 it is checked whether a shutdown requirement is present. The shutdown requirements are:

a message for the driver that the vehicle 1 will be shut down after a defined period of time T1;

an elapsed period of time T2 in which the vehicle 1 can still be continued to be driven despite the shutdown command;

an expired distance until which the vehicle 1 can still continue to be driven despite the shutdown command;

blocking of a vehicle speed to a defined maximum vehicle speed $v_{max}$ in the case of a confirmed vehicle shutdown command.

In method step S2.2 it is detected whether the driver of the vehicle 1 has obtained a message that the vehicle 1 will be shut down in a defined period of time T1, and whether this period of time has elapsed. This means, for example, that if the driver receives a message that the vehicle 1 will be shut down in 30 minutes, then the time will be clocked from the point in time of the message and the vehicle 1 will be shut down after 30 minutes has elapsed. No shutdown requirement exists before the period of time T1 has elapsed.

If the period of time T1 has elapsed and the driver has received a message, then, in step S2.3, the vehicle 1 is shut down.

If the period of time T1 has not yet elapsed or the driver has not obtained a message, then, in step S2.4, it is checked whether a defined period of time T2 has elapsed from the shutdown command. The time is therefore clocked from the point in time of the shutdown command and, if the defined period of time T2 has elapsed, the vehicle 1 is shut down.

If the period of time T2 has elapsed, then, in step S2.5, the vehicle 1 is shut down.

If the period of time T2 has not yet elapsed, then, in step S2.6, it is checked whether a defined distance D1 has expired. This means that the distance the vehicle 1 covers is detected from the point in time of the shutdown command. This happens, for example, by checking the odometer.

If the distance D1 has expired, then, in step S2.7, the vehicle 1 is shut down.

If the distance D1 has not expired, then, in step S2.8, it is checked whether the vehicle 1 is at a standstill. The standstill of the vehicle 1 is, for example, detected by the vehicle speed and the engine or oil temperature. If the speed of the vehicle 1 is, for example, zero and the oil temperature is low, then a standstill is suggested and the vehicle 1 is shut down.

If the vehicle 1 is at a standstill, then, in step S2.9, the vehicle 1 is shut down.

If the vehicle 1 is not at a standstill, then, in step S2.10, the vehicle 1 is not shut down.

FIG. 5 shows a flow diagram of a method to control the system to shut down a vehicle 1 with blocking of the vehicle speed. The vehicle speed of a vehicle 1 is, for example, a maximum of 250 km/h. This maximum vehicle speed is, for example, reduced to 100 km/h. This occurs, for example, by throttling the engine power.

In step S3.1 it is checked whether a shutdown requirement is present.

In step S3.2 it is checked whether the driver has received a message that the vehicle 1 is to be shut down in a defined period of time T1.

If the driver has not received a message, then, in step S3.3, the vehicle is not shut down.

If the driver has received a message, then, in step S3.4, the vehicle speed is reduced to a maximally defined vehicle speed $v_{max}$.

After the defined period of time T1 has expire, the vehicle 1 is shut down in method step S3.5.

Although the present invention has been described above by means of several exemplary embodiments, it is to be understood that the present invention is not restricted to these, but that various amendments and designs of the present invention can be implemented without leaving the scope of the present invention, as is defined in the enclosed claims.

The invention claimed is:

1. A system for shutting down an illegally used vehicle, the system comprising:
   a first control device of the vehicle configured to receive a vehicle shutdown command; and
   a server,
   wherein the server is external to the vehicle, connected to the first control device, and is configured to transmit the vehicle shutdown command to the first control device,
   wherein before the shutdown of the vehicle, the first control device is configured to request confirmation of the vehicle shutdown command from an external authorization system, wherein the external authorization system is external to the vehicle, and
   wherein a second control device initiates the shutdown of the vehicle when the confirmation of the vehicle shutdown command is received and at least one shutdown requirement is satisfied,
   wherein
   (A) the shutdown requirement is at least one of
      an elapsed period of time during which the vehicle can still continue to be driven despite the shutdown command, and
      a distance the vehicle is allowed to be driven despite the shutdown command, or
   (B) a speed of the vehicle is prevented from exceeding a defined maximum vehicle speed when the confirmed vehicle shutdown command has been received.

2. The system of claim 1, wherein the external authorization system is configured to transmit the confirmation of the vehicle shutdown command to
   the server, or
   the first control device.

3. The system of claim 1, wherein the first control device is configured to transmit the confirmed vehicle shutdown command to the second control device.

4. The system of claim 1, wherein the vehicle shutdown command and the confirmation of the vehicle shutdown command are encrypted.

5. A method for shutting down an illegally used vehicle, the comprising:
   receiving, by a first control device of the vehicle from a server that is external to the vehicle, a vehicle shutdown command;
   checking, by the first control device, whether a shutdown requirement is satisfied before the vehicle is shutdown;
   requesting, by the first control device, a confirmation of the vehicle shutdown command from an external authorization system, wherein the external authorization system is external to the vehicle; and
   initiating the vehicle shutdown by a second control device of the vehicle when the confirmation of the vehicle shutdown command is received and at least one shutdown requirement is satisfied,
   wherein
   (A) the shutdown requirement is at least one of
      an elapsed period of time during which the vehicle can still continue to be driven despite the shutdown command, and
      a distance the vehicle is allowed to be driven despite the shutdown command, or (B) a speed of the vehicle is prevented from exceeding a defined maximum vehicle speed when the confirmed vehicle shutdown command has been received.

6. The method of claim 5, wherein the shutdown requirement is a message for a driver that the vehicle will be shut down after a defined period of time.

7. A method for shutting down an illegally used vehicle, the comprising:
   transmitting, by a server, a vehicle shutdown command to a first control device of the vehicle;
   checking a shutdown requirement before the vehicle is shutdown;
   requesting, by the first control device, a confirmation of the vehicle shutdown command from an external authorization system; and
   initiating the vehicle shutdown by a second control device when the confirmation of the vehicle shutdown command is received and at least one shutdown requirement is satisfied,
   wherein
      (A) the shutdown requirement is at least one of
         an elapsed period of time during which the vehicle can still continue to be driven despite the shutdown command, and
         a distance the vehicle is allowed to be driven despite the shutdown command,
      or
      (B) a speed of the vehicle is prevented from exceeding a defined maximum vehicle speed when the confirmed vehicle shutdown command has been received.

8. The method of claim 1, wherein the shutdown requirement further comprises a message for a driver that the vehicle will be shut down after a defined period of time.

9. The system of claim 1, wherein the external authorization system is a mobile telephone.

10. The system of claim 1, wherein before the shutdown of the vehicle, the first control device is configured to check whether a shutdown requirement is satisfied.

11. The method of claim 5, wherein the external authorization system is a mobile telephone.

12. The method of claim 5, further comprising:
    receiving, by the first control device, the confirmation of the vehicle shutdown command.

13. The method of claim 12, wherein the confirmation of the vehicle shutdown command is received by the first control device from the server.

14. The method of claim 12, wherein the confirmation of the vehicle shutdown command is received by the first control device from the external authorization system.

* * * * *